E. LOESSER.
APPARATUS FOR MAKING DOPS FOR HOLDING PRECIOUS STONES TO BE GROUND.
APPLICATION FILED OCT. 21, 1913.
1,088,235.
Patented Feb. 24, 1914.
2 SHEETS—SHEET 1.
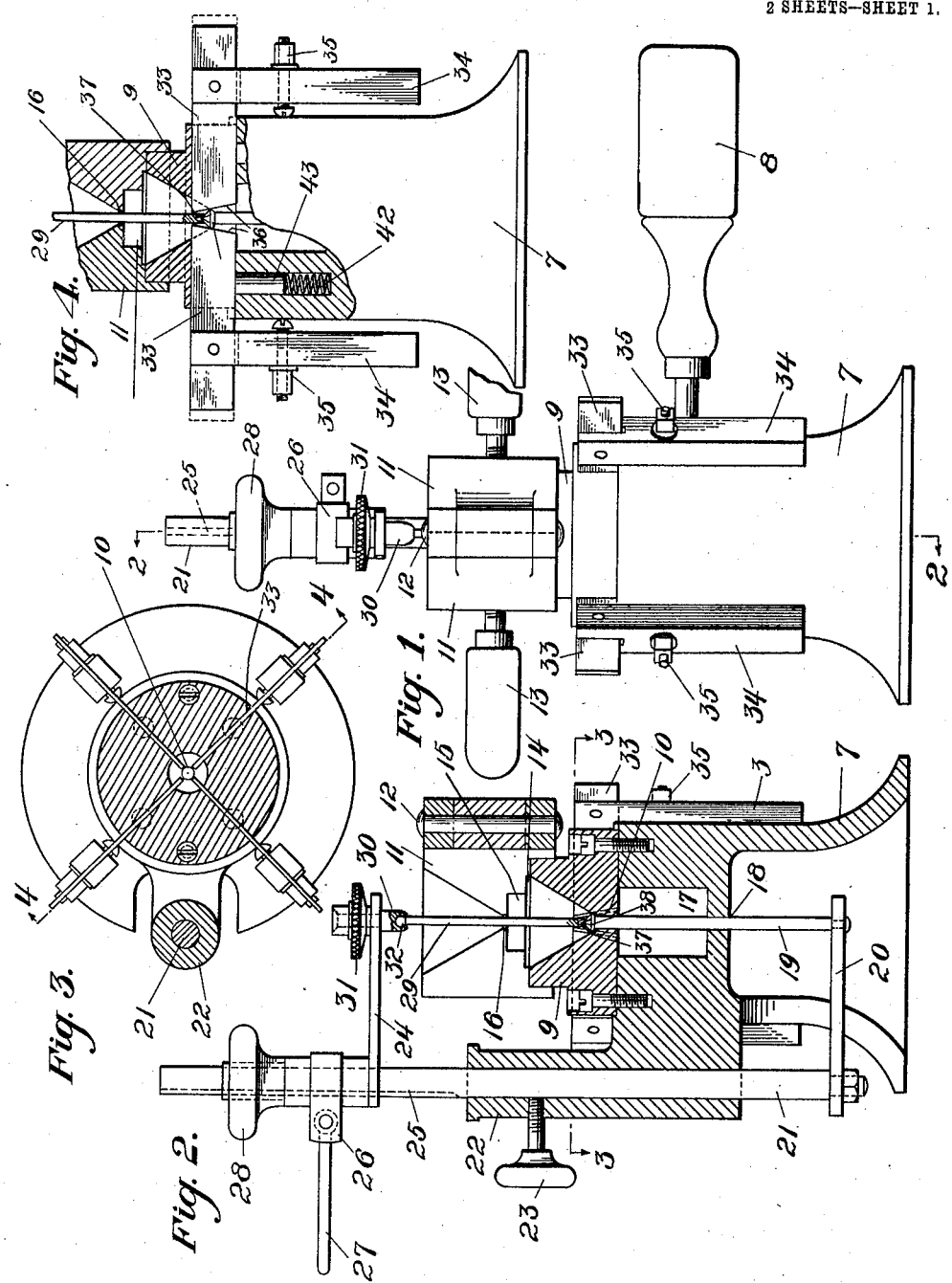
Witnesses:
L. F. Browning
F. Meisner
Inventor
Ernest Loesser
By his Attorney
Edward C. Davidson E. LOESSER.
APPARATUS FOR MAKING DOPS FOR HOLDING PRECIOUS STONES TO BE GROUND.
APPLICATION FILED OCT. 21, 1913.
1,088,235.
Patented Feb. 24, 1914.
2 SHEETS—SHEET 2.
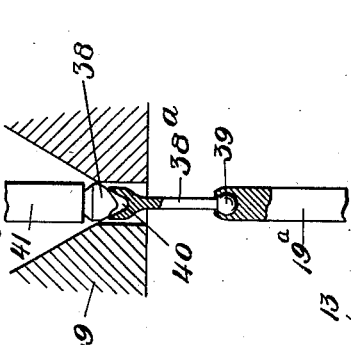
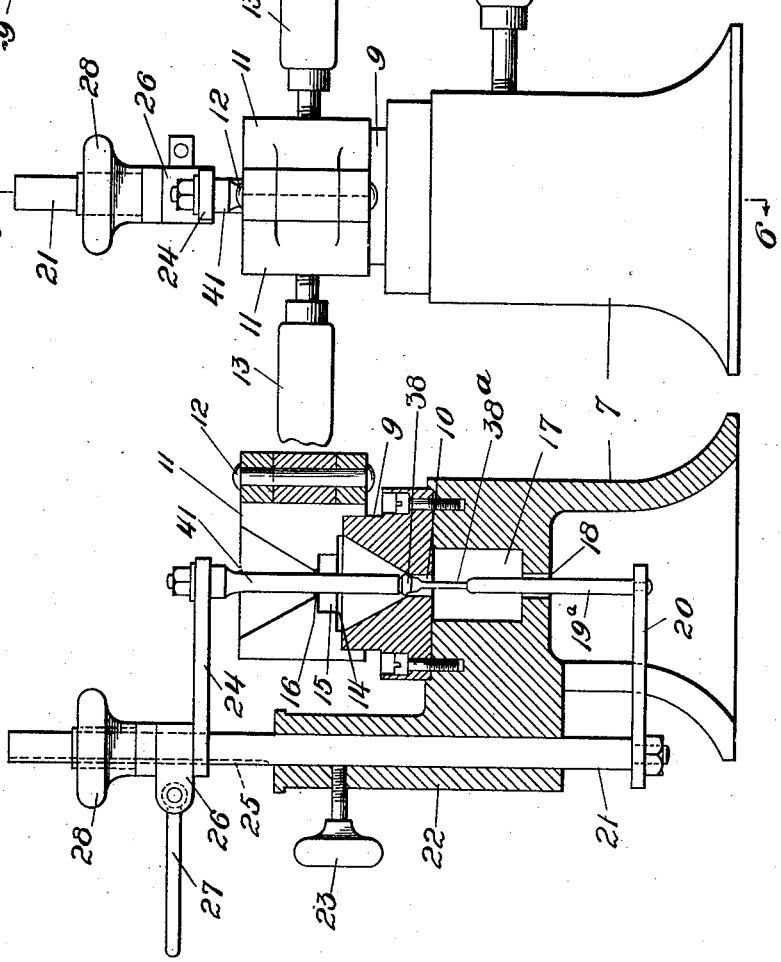

UNITED STATES PATENT OFFICE.

ERNEST LOESSER, OF GLEN RIDGE, NEW JERSEY, ASSIGNOR OF THREE-FOURTHS TO SAMUEL JACOBSON, TRUSTEE, OF NEW YORK, N. Y.

APPARATUS FOR MAKING DOPS FOR HOLDING PRECIOUS STONES TO BE GROUND.

1,088,235. Specification of Letters Patent. Patented Feb. 24, 1914.

Application filed October 21, 1913. Serial No. 796,382.

*To all whom it may concern:*

Be it known that I, ERNEST LOESSER, a citizen of the United States of America, residing in Glen Ridge, county of Essex, and State of New Jersey, have invented a certain Improved Apparatus for Making Dops for Holding Precious Stones to be Ground, of which the following is a specification.

The apparatus forming the subject of this invention consists of a mold for casting dops and means for suitably holding diamonds and other precious stones at one end of the mold, the arrangement being such that when the dop metal is poured into the mold the stone will be securely held at one end of the dop. The dop is preferably in general form conical and adapted to be seated in a dopholder, which is, at the apex of the dop, to be properly applied to a grinding "skeif" or "lap."

In the accompanying drawings: Figure 1, is a front elevation; Fig. 2, is a vertical section on line 2, 2, Fig. 1; Fig. 3, a horizontal section on line 3, 3, Fig. 2; Fig. 4, a part vertical section on line 4, 4, Fig. 3; Fig. 5, a front elevation of an apparatus with certain structural modifications; Fig. 6, a vertical section of the same on the line 6, 6, Fig. 5, and: Fig. 7, is an enlarged view of the lower end of the mold and the stone holding rods.

The base 7 is provided with a handle 8, and has secured to its upper face, by screws or other means, the dop mold 9 whose interior is conical and has a cylindrical passage 10 at the apex of the cone.

The gate of the apparatus consists of two jaws 11 hinged together at 12 and provided with handles 13 by which it may be placed on and closed over the upper end of the mold. The gate is recessed at its lower side to fit snugly over the top of the mold and has an inner recess 14 of the same, or about the same, size as the upper end of the mold cavity, and a further inner recess 15, of less diameter than recess 14, from which extends a central opening 16 connecting the recess 15 with the main pouring cavity of the gate.

In the base below the mold is a chamber 17 and in the bottom of it is provided a bore 18 axially in line with the passage 10 of the mold, and in the bore and passage slides a rod 19 held at its lower end by an arm 20 extending from a vertically disposed rod 21. This rod 21 is fitted to slide in the extension 22 of the base and is held in any set position therein by a set screw 23. The part of rod 21 projecting above extension 22 carries an arm 24, the boss of which is provided with a key or spline seated in a slot 25 in the rod 21 so as to cause the end of the arm to maintain its proper position centrally over the axis of the mold. The boss of the arm 24, is provided with an ordinary split clamp 26, which is actuated to grip the rod 21 by the handle 27 and also with a knob 28 by which the arm 24 may be raised and lowered.

From the end of arm 24 extends downwardly a rod 29 in alinement with the rod 19, and it is connected to the arm by a holder 30 and a thumb piece 31 for rotating the rod 29. The connection of the rod 29 with the holder 30 is a universal joint, such as a ball and socket, as shown at 32, thereby permitting the lower end of the rod to swing in all directions.

In right-angularly formed slots in the lower part of the mold 9 are fitted to slide thin flat bars 33 whose inner ends extend into the conical cavity of the mold, and at their outer parts are secured depending rods 34 which are provided with adjustable means 35, such as screws and lock nuts, arranged to abut against the sides of the base 7 when set to bring the inner ends of the bars 33 in the desired positions to properly locate the end of rod 29 against which the ends of the bars come when they are pressed inwardly with their adjustable stops against the base 7. The inner ends are beveled downwardly, as shown more clearly at 36 in Fig. 4, so that their upper pointed corners only contact with rod 29. Should any of the metal poured into the mold flow down into the slots adjacent the stone it would be in the form of thin webs and may be readily removed from the dop.

To apply a stone to the mold the rod 19 is raised with its upper flat end above the upper face of the mold, the gate having been previously removed, the stone then placed on the rod 19 and the upper rod 29 set down on the top of the stone and held in this position by tightening the clamp 26. The lower end of rod 29 is hollow or cup form, as at 37, so that the rod will firmly hold the stone. The rod 21 is then lowered, carrying with it rods 19 and 29, to set the stone 38 at the apex of the conical mold cavity. The bars 33 by being pressed inwardly act by their inner ends to properly centralize the lower end of rod 29 and the upper part of the stone. Of course, it will be understood that stones with their tables and collets previously ground will be suitably held and located in the mold for attachment to dops. The dop metal being poured through the gate, properly located over the mold will fill the mold cavity and adequately secure the stone to the end of the dop. The rod 29 may, as thought expedient, be left in or withdrawn from the mold during or before pouring the metal. Upon removal of a dop with attached stone the thin bars 33 will, by action of the dop on the inclined ends of the bars, be forced outwardly should they be left in set position in the mold, or the beveled inner ends may be withdrawn from the dop by pressing inwardly against base 7 the lower ends of rods 34.

It is desirable to provide means for holding the bars 33 against accidental displacement. Friction devices are suitable for this purpose, a simple form being shown in Fig. 4 each consisting of a spring 42 and a plug 43 resting on the spring and bearing against the underside of a bar, the spring 42 and plug 43 being placed in a hole bored in the bed or base 7 beneath each of the bars 33.

The part or sprue of the metal cast in the gate may be readily removed from the dop as the small connection formed in the neck 16 may be easily broken.

In the modification shown in Figs. 5, 6, 7, the rod 19ª carried by the arm 20 extends only into the chamber 17, and a rod 38ª is connected to its upper end by a ball and socket joint 39 imparting to the upper end of said rod 38ª freedom of slight lateral movements. The upper end of this rod 38ª, is enlarged and hollow or cup formed as shown at 40, Fig. 7. The upper rod 41 rigidly carried at the end of arm 24 has its lower end flat so that a stone placed and held between the rods 38ª and 41 is in inverted position to that shown in the other views of the drawings. The procedure and mode of operation of casting dops is in all respects similar, with the exception of the omission of the centralizing bars 33 from the modified form of the apparatus which, in this respect is more simple than the apparatus as first described.

I claim:

1. Dop molding apparatus comprising a mold open at both ends, two rods in alinement, longitudinally relatively adjustable and adapted to clamp a stone between their adjacent ends and collectively axially adjustable in the mold, means for carrying the rods adjustably parallel to the axis of the mold, whereby the stone clamped between them may be held at one end of the mold, one of the rods having its clamping end flat and the other one having its clamping end hollow or cup form.

2. Dop molding apparatus comprising a mold open at both ends, two rods in alinement, longitudinally relatively adjustable and adapted to clamp a stone between their adjacent ends and collectively axially adjustable in the mold, means for carrying the rods adjustably parallel to the axis of the mold, whereby the stone clamped between them may be held at one end of the mold, one of said rods maintaining its axial position, and a universal joint connecting the other rod to its support whereby the clamping end of said rod may be set in different lateral positions.

3. Dop molding apparatus comprising a mold open at both ends, two rods in alinement, longitudinally relatively adjustable and adapted to clamp a stone between their adjacent ends and collectively axially adjustable in the mold, means for carrying the rods adjustably parallel to the axis of the mold, whereby the stone clamped between them may be held at one end of the mold, one of the rods having its clamping end flat and the other one having its clamping end hollow or cup form and a universal joint connecting the cup formed end rod to the rod carrying means whereby its cup formed end may be set in different lateral positions relative to the stone clamping end of the other rod.

4. Dop molding apparatus comprising a mold open at both ends, two rods in alinement longitudinally relatively adjustable and adapted to clamp a stone between their adjacent ends and collectively axially adjustable in the mold, means for carrying the rods adjustably parallel to the axis of the mold, whereby the stone clamped between them may be held at one end of the mold, radially arranged bars extending through the walls of the mold into its interior and radially adjustable whereby by their inner ends the stone clamping end of one of the rods may be set and held in different lateral positions relative to the clamping end of the other rod.

5. Dop molding apparatus comprising a mold having a conical cavity open at both ends, a pouring gate adapted to seat over the large end of the conical cavity of the mold and having a narrow connecting passage between its pouring cavity and the conical mold cavity thus providing a small neck between the dop and the sprue whereby they may readily be separated, a rod arranged to move axially through the apex end of the conical mold cavity, a rod arranged to move axially through the gate and the mold cavity, and means for carrying the rods and adjusting their adjacent ends relative to one another and also adjusting the rods together coincident with the axis of the mold, whereby a stone may be clamped between the adjacent ends of the rods and set and held at the apex of the mold, radially arranged bars extending through the mold into its cavity and radially movable, their inner ends adapted to set and hold the stone clamping end of one of the rods.

6. Dop molding apparatus comprising a mold having a conical cavity open at both ends, a pouring gate adapted to seat over the large end of the conical cavity of the mold and having a narrow connecting passage between its pouring cavity and the conical mold cavity, thus providing a small neck between the dop and the sprue whereby they may readily be separated, a rod arranged to move axially through the apex end of the conical mold cavity, a rod arranged to move axially through the gate and the mold cavity, and means for carrying the rods and adjusting their adjacent ends relative to one another and also adjusting the rods together coincident with the axis of the mold, whereby a stone may be clamped between the adjacent ends of the rods and set and held at the apex of the mold and radially arranged bars extending through the mold into its cavity and radially movable, their inner ends adapted to set and hold the stone clamping end of one of the rods and spring frictional devices for holding the bars in set positions.

7. Dop molding apparatus comprising a mold having a conical cavity open at both ends, a pouring gate adapted to seat over the large end of the conical cavity of the mold, a rod having a flat top extending upwardly into the apex of the mold cavity, a rod having its lower end cup form extending downwardly through the gate into the mold cavity, means for carrying the rods and adjusting them relatively to one another, whereby a stone may be clamped between their adjacent ends, and moving them together axially to the mold to set the clamped stone at the apex of the conical mold cavity.

8. Dop molding apparatus comprising a mold having a conical cavity open at both ends, a pouring gate adapted to seat over the large end of the conical cavity of the mold, a rod having a flat top extending upwardly into the apex of the mold cavity, a rod having its lower end cup form extending downwardly through the gate into the mold cavity, means for carrying the rods and adjusting them relatively to one another, whereby a stone may be clamped between their adjacent ends, and moving them together axially to the mold to set the clamped stone at the apex of the conical mold cavity, a universal connection between the upper end of the upper rod and its carrying means, and radially arranged bars extending through the walls of the mold into its cavity and provided with adjustable stops, whereby their inner ends may be set to act on and hold the lower end of the upper rod to set and hold the stone in proper position at the apex of the mold cavity.

9. Dop molding apparatus comprising a mold open at both ends, two rods in alinement longitudinally relatively adjustable and adapted to clamp a stone between their adjacent ends and collectively axially adjustable in the mold, means for carrying the rods adjustably parallel to the axis of the mold, whereby the stone clamped between them may be held at one end of the mold, radially arranged bars extending through the walls of the mold into its interior and radially adjustable stops for determining the positions of the ends of the bars relatively to the axis of the mold, whereby by their inner ends the stone clamping end of one of the rods may be set and held in different lateral positions relative to the clamping end of the other rod.

10. Dop molding apparatus comprising a mold open at both ends, two rods in alinement longitudinally relatively adjustable and adapted to clamp a stone between their adjacent ends and collectively axially adjustable in the mold, means for carrying the rods adjustably parallel to the axis of the mold, whereby the stone clamped between them may be held at one end of the mold, radially arranged bars extending through the walls of the mold into its interior and radially adjustable frictional devices adapted to act on the bars to hold them in set positions whereby by their inner ends the stone clamping end of one of the rods may be set and held in different lateral positions relative to the clamping end of the other rod.

11. Dop molding apparatus comprising a mold open at both ends, two rods in alinement longitudinally relatively adjustable and adapted to clamp a stone between their adjacent ends and collectively axially adjustable in the mold, means for carrying the rods adjustably parallel to the axis of the mold, whereby the stone clamped between them may be held at one end of the mold, radially arranged bars extending through the walls of the mold into its interior and radially adjustable, the inner ends of said bars being beveled or inclined from their upper corners outwardly whereby by their inner ends the stone clamping end of one of the rods may be set and held in different lateral positions relative to the clamping end of the other rod.

12. Dop molding apparatus comprising a mold open at both ends, two rods in alinement longitudinally relatively adjustable and adapted to clamp a stone between their adjacent ends and collectively axially adjustable in the mold, means for carrying the rods adjustably parallel to the axis of the mold, whereby the stone clamped between them may be held at one end of the mold, radially arranged bars extending through the walls of the mold into its interior and radially adjustable stops for determining the positions of the ends of the bars relatively to the axis of the mold, the inner ends of said bars being beveled or inclined from their upper corners outwardly, whereby by their inner ends the stone clamping end of one of the rods may be set and held in different lateral positions relative to the clamping end of the other rod.

In testimony whereof, I have hereunto subscribed my name.

ERNEST LOESSER.

Witnesses:
  L. F. BROWNING,
  LAURA E. SMITH.

---

Copies of this patent may be obtained for five cents each, by addressing the "Commissioner of Patents, Washington, D. C."